(12) United States Patent
Corren et al.

(10) Patent No.: US 7,973,240 B2
(45) Date of Patent: Jul. 5, 2011

(54) CABLE JACKET SEALING, PRESSURIZATION, AND MONITORING

(75) Inventors: Dean Corren, Burlington, VT (US);
Douglas A. Lessig, Erie, CO (US);
Christopher Gray, Wheaton, IL (US);
John Gray, Charlottesville, VA (US)

(73) Assignee: Verdant Power, Arlington, VA (US)

( * ) Notice: Subject to any disclaimer, the term of this patent is extended or adjusted under 35 U.S.C. 154(b) by 1075 days.

(21) Appl. No.: 11/727,112

(22) Filed: Mar. 23, 2007

(65) Prior Publication Data
US 2008/0271803 A1 Nov. 6, 2008

(51) Int. Cl.
*H01R 4/00* (2006.01)
(52) U.S. Cl. ..................................... 174/84 R
(58) Field of Classification Search ............... 174/74 R, 174/77 R, 75 C, 79, 84 R, 84 S, 88 R
See application file for complete search history.

(56) References Cited

U.S. PATENT DOCUMENTS

| | | | | |
|---|---|---|---|---|
| 1,581,539 A | * | 4/1926 | Kauch et al. | 244/54 |
| 3,054,847 A | * | 9/1962 | Colbert | 174/88 R |
| 3,663,306 A | * | 5/1972 | Des Champs et al. | 136/202 |
| 4,565,929 A | * | 1/1986 | Baskin et al. | 290/44 |
| 4,613,279 A | * | 9/1986 | Corren et al. | 415/121.2 |
| 4,783,576 A | * | 11/1988 | Silver et al. | 174/25 R |
| 5,798,572 A | * | 8/1998 | Lehoczky | 290/54 |
| 5,801,465 A | * | 9/1998 | Yamada | 310/71 |
| 6,326,550 B1 | * | 12/2001 | Dyer et al. | 174/93 |
| 6,736,545 B2 | * | 5/2004 | Cairns et al. | 385/56 |

* cited by examiner

*Primary Examiner* — William H Mayo, III
(74) *Attorney, Agent, or Firm* — Davidson Berquist Jackson & Gowdey, LLP (57) ABSTRACT

An underwater power generating system includes an underwater power generating device, a closed nacelle and a connecting cable system that is provided with an open passage way extending there along that is sealed at one end to the interior of the closed nacelle. The cable system can be used in a number of ways, such as by having the second end being sealed, to prevent air from escaping the closed nacelle, or by having the second end connected to a source of positive pressure thereby permitting the cable to be sufficiently pressurized to provide a positive pressure internally within the closed nacelle that is at least slightly greater than the nacelle at depth pressure, and thus greater than water pressure acting on the exterior of the closed nacelle, to prevent water ingress within the nacelle, as well as to transmit power and/or other data between the nacelle and shore monitoring and control facilities.

25 Claims, 6 Drawing Sheets

FIG. 7

CABLE JACKET SEALING, PRESSURIZATION, AND MONITORING

FIELD OF THE INVENTION

This relates to Kinetic Hydro Power (KHP) system turbines and in particular to multi-use cables for providing a path to transmit power and data to and from the turbines as well as a path for pressurizing the sealed nacelle of a KHP system turbine.

BACKGROUND AND OVERVIEW

A typical KHP system is described in U.S. Pat. No. 4,613,279 the entire contents of which are incorporated herein by reference. Typical KHP systems employ one or more turbines anchored to a river bottom each of which include an external rotor that rotates in response to water flowing there past that is coupled, via a rotating shaft seal, to a nacelle or the body of the turbine. The nacelle desirably is a watertight enclosure of the turbine in which machinery comprising various electrical and mechanical components are contained. Rotation of the rotor causes the electrical and mechanical components to generate power and cable connections are needed so that the generated power can be transmitted from the turbine onto the power grid or other load and the electrical signals can be sent to or received from the turbine at an onshore control facility.

The rotating shaft seal may be less than perfectly watertight in KHP system turbines, and water can leak into the closed nacelle portion of the turbine which can cause problems. In one embodiment this problem is overcome by having the electrical cables connecting the turbine to the station sealed to the nacelle and at their far ends as well to prevent internal air within the nacelle from venting along the cables. In another embodiment use is made of the cable's ability of conducting gases, either through the spaces between wires within the cable, or via a separate gas channel, to link a pressure source to the interior of the nacelle to thereby maintain a positive pressure in the nacelle in order to counteract the inward pressure of the surrounding water.

The specific problem for underwater turbines is the need to prevent water from entering the sealed nacelle, such as possible through the dynamic (rotating) shaft seal of the turbine, through the connection to a supporting pylon, or any other joint or seam (static seals) in the nacelle. Keeping air within the nacelle or by providing air or another fluid, such as dry nitrogen, under pressure along the cable, a positive pressure can be created and maintained within the nacelle so that water can be kept out of both the nacelle and the cable itself.

Furthermore, since the nacelle is underwater, water pressure is acting on the exterior of the nacelle and depending on the depth of the nacelle the water pressure may be significant. Exposure to significant water pressure may cause water to leak through the seals of the nacelle. For this reason, it can be desirable to keep the interior of the nacelle at an equal or even higher pressure than the exterior water pressure, thus creating a zero net pressure differential of an overall positive pressure within the nacelle.

A positive pressure or atmosphere can be created and maintained within the nacelle through the use of a novel pressurized cable system that includes particular cable end seals, and for creating a positive pressure uses an open passageway that extends along the length of the power and/or data cables. This is accomplished by using an existing or designing a purpose-built cable that can provide art open pathway to send positive pressure along the length of the cable to the nacelle, encase the necessary power and electrical conduits, and yet be accessed at each of the distal and proximal ends in such way that electric control signals and the generated power can be accessed while maintaining suitable positive gas pressure along the length of the cable even when bent. Further, water ingress can be prevented by simply preventing air from venting through cables connecting under water power turbine to onshore control facility by sealing the cable ends.

This allows the following benefits: not allowing the air to vent from within the nacelle and/or maintaining a positive pressure within the nacelle prevents ingress of water at the turbine nacelle end and the gas pressure in the cable and nacelle can be monitored and controlled from the proximal end. Furthermore, in the event that the cable jacket is punctured, the effect thereof can be minimized, since there is a positive pressure throughout the length of the cable. Additionally, changes in the sealing status of the nacelle and cable can be detected via changes in the flow rate of the pressurizing medium.

BRIEF DESCRIPTION OF THE DRAWINGS

The invention is better understood by reading the following detailed description with reference to the accompanying drawings in which.

DETAILED DESCRIPTION OF THE PRESENTLY PREFERRED EXEMPLARY EMBODIMENTS

Figure 1:
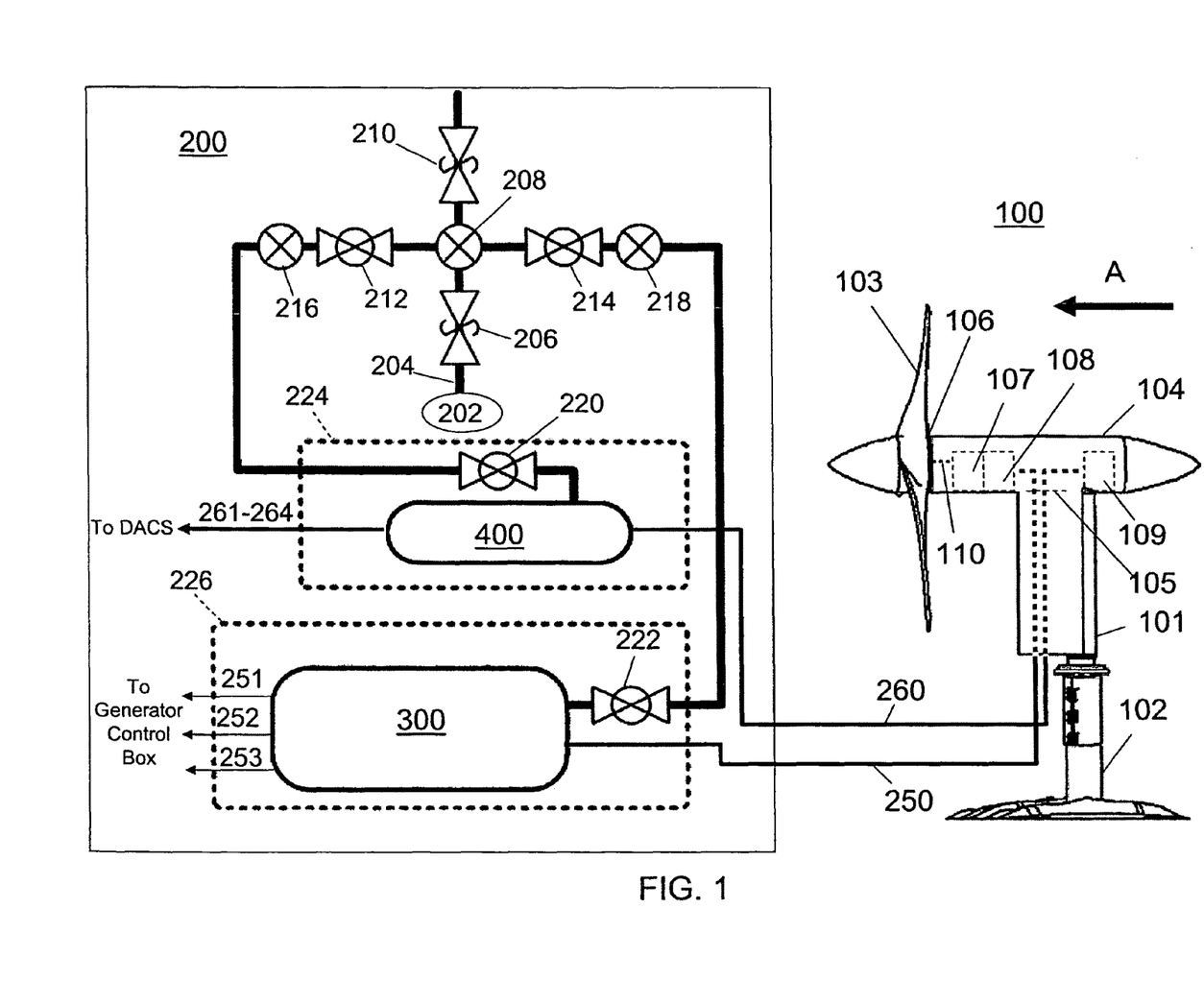
FIG. 1 is a diagrammatic sketch of a Kinetic Hydro Power System.

FIG. 1 shows an exemplary embodiment of the present KHP system. A KHP turbine 100 is anchored to the bottom of a river or other body of water using a pylon 101 mounted to a monopile 102, or another site specific anchoring or mounting device. The turbine 100 comprises three main portions including a rotor 103 rotatably mounted to a nacelle 104 and pylon 101. The nacelle 104 can be attached to the pylon 101 or made part of it. The pylon 101 is attached to the monopile 102 in such a way that the pylon 101 and nacelle 104 are able to rotate about the vertical axis. This allows rotor 103 to almost always be in an optimal position for generating power within the flow of the water, regardless of changes in the direction of that water flow. For example, in a tidal river nacelle 104 and rotor 103 are able to face one direction when the tide is coming in yet rotate into another position when the tide is going out. Flow direction is shown in FIG. 1 by arrow "A".

The nacelle 104 encloses suitable power generating components including, for example a gear box 107 and a generator 108. Furthermore, the nacelle may include various electronic controls and monitoring components 109 such as for monitoring pressure, temperature, the pressure of water, or other operating or performance parameters. Since nacelle 104 is underwater some amount of water pressure is continuously acting on its exterior. The water pressure on the nacelle 104 when it is at a depth of 20 feet, for example, is approximately 10 psi above atmospheric pressure, and at a depth of 100 feet is approximately 43 psi above atmospheric pressure. However, nacelle 104 can be placed at any number of depths and as such can be subject to a wide range of pressures. In one embodiment, the ends of the cables entering the nacelle 104 are sealed thereto and the opposite cable ends are sealed to prevent interior air within the nacelle from venting out along the cables. In another embodiment, when establishing a positive pressure within the interior of the nacelle 104, in most cases the level of pressure should be at least enough to offset the water pressure at the depth the equipment is located and thereby create a zero or preferably slightly positive overall pressure within the nacelle 104 (e.g. 0.5-5 psi). However, there may be reasons to have the ability to create pressure within the nacelle 104 that is significantly higher than the water pressure, for example to purge water from the interior of the nacelle 104. When purging water from the nacelle 104 a higher pressure, e.g. at least 5 psi higher than the water pressure, could be applied to the nacelle for a relatively short period of time, for example for a few seconds to a few minutes. Thus, it should be understood that the pressure within the nacelle 104 can be adjusted, either in accordance with sensed conditions or when desired at various chosen water pressure levels to create any desired pressure within the nacelle. The nacelle 104 and its dynamic and static seals must be designed and built so as to tolerate such internal pressures without damage.

A shaft 110 of the rotor 103 is rotatably coupled to the nacelle 104 through a dynamic shaft seal 106 that allows the shaft 110 to pass through seal 106 in a watertight manner, so that it can engage and operate the gears of the gearbox 107 which drives generator 108 in accordance with the rotation of the rotor 103 without allowing water to leak into nacelle 104. As generator 108 is driven via gearbox 107, generator 108 creates electrical power that is transmitted or fed onto a power grid or other load, as is known in the art.

In the most basic case, turbine 100 would be completely reliable and self-sufficient, that is turbine 100 would simply generate power without needing to be monitored or controlled in any active or auxiliary way. This would minimize the cost of turbines 100 and the connections thereto, because electronic controls and monitoring components 109 could be eliminated from the system. Consequently, while turbine 100 is described herein as possibly including various electronic controls and monitoring components 109 or other architectures of electronic controls and monitoring systems, those electronic controls and monitoring components 109 are non-limiting, exemplary and may be omitted.

Where electronic controls and monitoring components 109 are provided, they can include several sensors such as temperature sensors (not shown) for measuring the temperature within the nacelle 104 or within one or more of the bearings, or within the generator, a tachometer (not shown) for measuring the rotational speed of rotor 103, an accelerometer (not shown) for measuring movements of the turbine, a vibration sensor (not shown) for measuring vibrations within turbine 100, moisture detectors or water level detectors (not shown) for sensing water within nacelle 104, a torque sensor (not shown) for measuring, in conjunction with the tachometer, the mechanical power (performing dynamometry) of the rotor 103, and various sensors for measuring the position or orientation of the nacelle 104 with respect to the bottom of the waterway, magnetic north, a position in space or even to the monopile 102. Furthermore, sensors for detecting the pressure in the nacelle 104 can also be included.

When used, signals from each one or more of these sensors allow a control system at control station 200 to monitor the operation of turbine 100, to detect if turbine 100 is operating properly, or in a state which might cause damage to the turbine 100, and permit a monitoring of the operating conditions in nacelle 104 and of turbine 100. For example, turbine 100 may be operating at too high of a temperature, indicating a bearing problem, or the dynamic shaft seal 106 may be leaking water into the nacelle 104. In such cases, sensors can alert an operator of potential or actual problems and in extreme situations the operator or an automatic system can shut down a turbine rotation to prevent or minimize damage to the turbine 100 or other system components.

Another situation that can occur is that as the water flow slows down, the rotor 103 may be capturing and providing so little power that the generator 108 may actually start to drain power from the grid rather than providing power. In such a case, an electronically-controlled switch, such as a Siemens 7UM61 microprocessor-controlled multifunction relay that is designed to sense low power output and switch the power contactor to disconnect the turbine generator 108 from the grid, is used to disconnect the generator 108.

FIG. 1 shows a general case where turbine 100 is coupled to the control station 200 via power cable 250 and data cable 260. It should be noted that turbines are not required to have both a power cable 260 and data cable 260 and that turbines are typically connected to the control station 200 via either a power cable 250 or a data cable 260. It should also be noted that a data cable 260 is not necessary to transmit data signals as data could be transmitted on a power cable 250, as is described in accordance with FIG. 2, or such data might not be transmitted at all.

In the exemplary embodiment of FIG. 1, the distal or first ends of power cable 250 and data cable 260 enter the body or outer shell of nacelle 104 through a watertight, static seal mounted to a connector plate 105, preferably located on the base of nacelle 104. Cables 250 and 260 can be fed through an opening provided along the length of pylon 101 with enough slack being provided within the interior of pylon 101 so that cables 250 and 260 will not hinder rotation of nacelle 104 about a vertical axis or pinch or bind the gas pathway within the cable as a result of that rotation. Cables 250 and 260 preferably run along the river bed and in installations involving a plurality of turbines, the cables from each will preferably be collected and collectively routed to control station 200. Each of the cables 250 and 260 may be weighted at points along their length, buried in the bottom, or otherwise held in place on the riverbed to prevent fouling and to maintain an organized installation.

Figure 5:
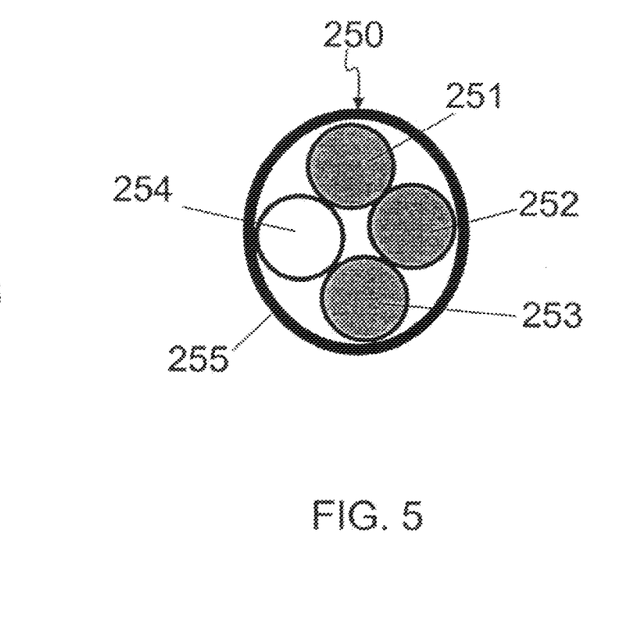
FIG. 5 shows a power cable with an internal gas conducting conduit.

The cables 250 and 260 provide multiple functions of allowing power being generated to be accessed, providing a pathway over which data and power signals can be transmitted to and from the electronic controls and monitoring components 109, as well as providing a gas pathway. Although one exemplary embodiment uses each of a power cable 250 and a data cable 260, each within a separate casing, these functions can be provided within a single power cable capable of transmitting power signals and data signals, or through the use of multiple cables contained within a single outer jacket. Furthermore, cables 250 and 260 can include one or more separate internal gas conduits, as shown in FIG. 5 for power cable 250, for producing a positive pressure environment within the interior of nacelle 104.

In the simplest form, each of the cables 250 and 260 will pass through seals within the shell of nacelle 104, so that no air can escape from around the cable, and the interior end of each cable could simply be sealed, with an epoxy or other form of sealant material that will effectively seal all the internal passages that might be exposed at the cable's first end located within the nacelle 104 so that no fluid, such as a gas or air, can pass that sealed end. Alternatively, the opposite ends can simply remain sealed within end seals 300, 400 and 500 to prevent air flow along the cables. This way air within the nacelle 104 could not vent along fully intact cables and escape since the air tight and sealed end seals would prevent such air movement. In another embodiment, the control station 200 includes a pressurization system that allows power cable 250 and data cable 260 to be pressurized along their length and also to pressurize the nacelle 104. Pressure source 202 provides a pressurized gas, for example air or nitrogen, to the inlet 204 of the pressurization system. Gas inlet 204 typically allows a maximum of about 150 psi for the system. Gas inlet 204 is connected to a pressure regulator 206 that regulates the pressure beyond inlet 204 to a maximum of about 20 psi. The output of pressure regulator 206 is fed past gauge 208 which measures the pressure at that point. Gauge 208 is connected to relief valve 210 that releases air from the system should the pressure become too high, as is known in the art. Relief valve 210 is typically a 15 psi relief valve, but a relief valve with a higher or lower psi setting can be used if necessary depending on the design of certain turbine components and the depth at which the turbine will be installed. Gauge 208 is also connected to charging valves 212 and 214 that are connected to respective gauges 216 and 218 and establish the pressure for each cable 250 and 260. Charge valve 212 acts as the pressure source for the data cable end seal 400, and charge valve 214 acts as the pressure source for the power cable end seal 300. Pressure line shutoff valves 220 and 222 are also connected to respective cable end seals 400 and 300 to control the flow of pressurized gas to each end seal and allow each turbine to retain a pressure charge even when the cable end seal is not connected to the pressurization system, e.g. prior to and during installation. It should also be understood that the amount of pressure and control there over can be accomplished using appropriate regulator or control systems (not shown), which are well know in the art and further description is neither warranted nor needed.

Figure 2:
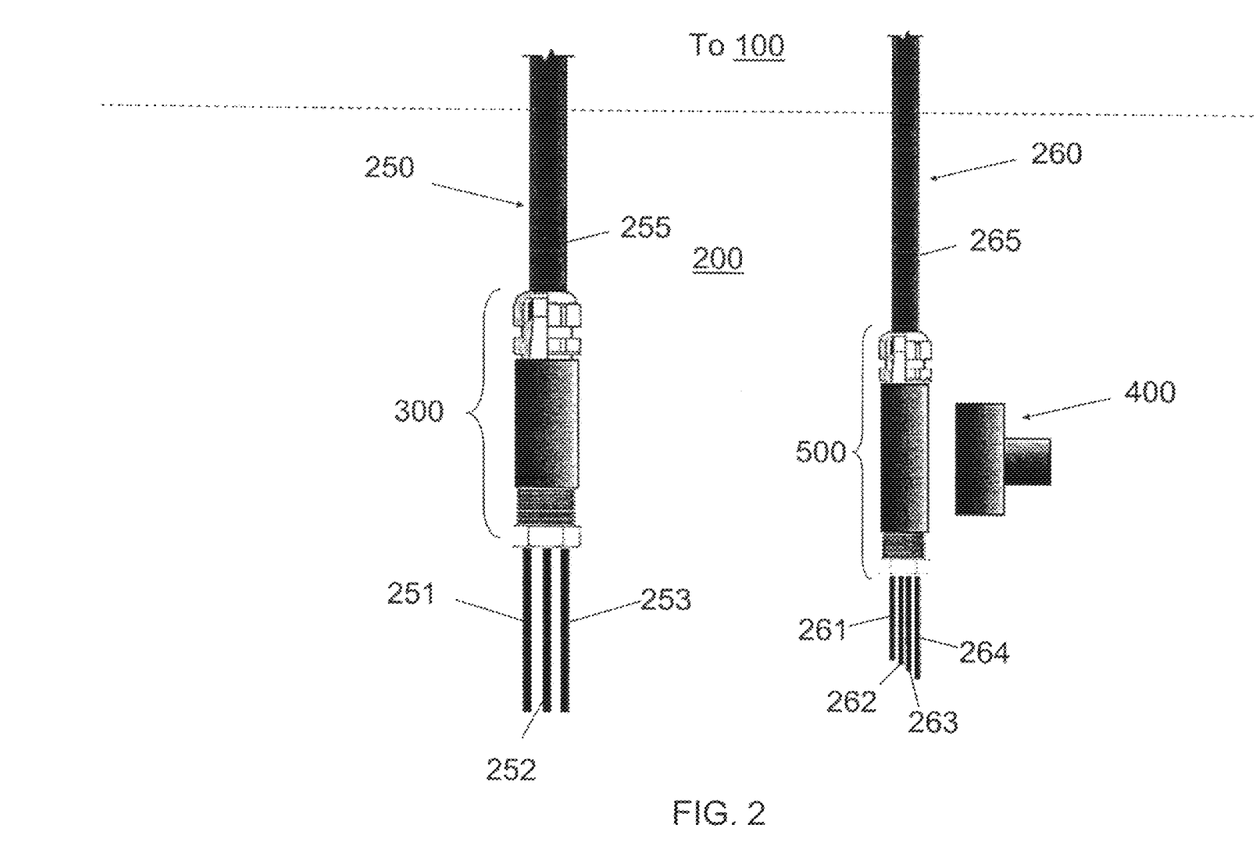
FIG. 2 shows cable end seals on a variety of cables.
Figure 3:
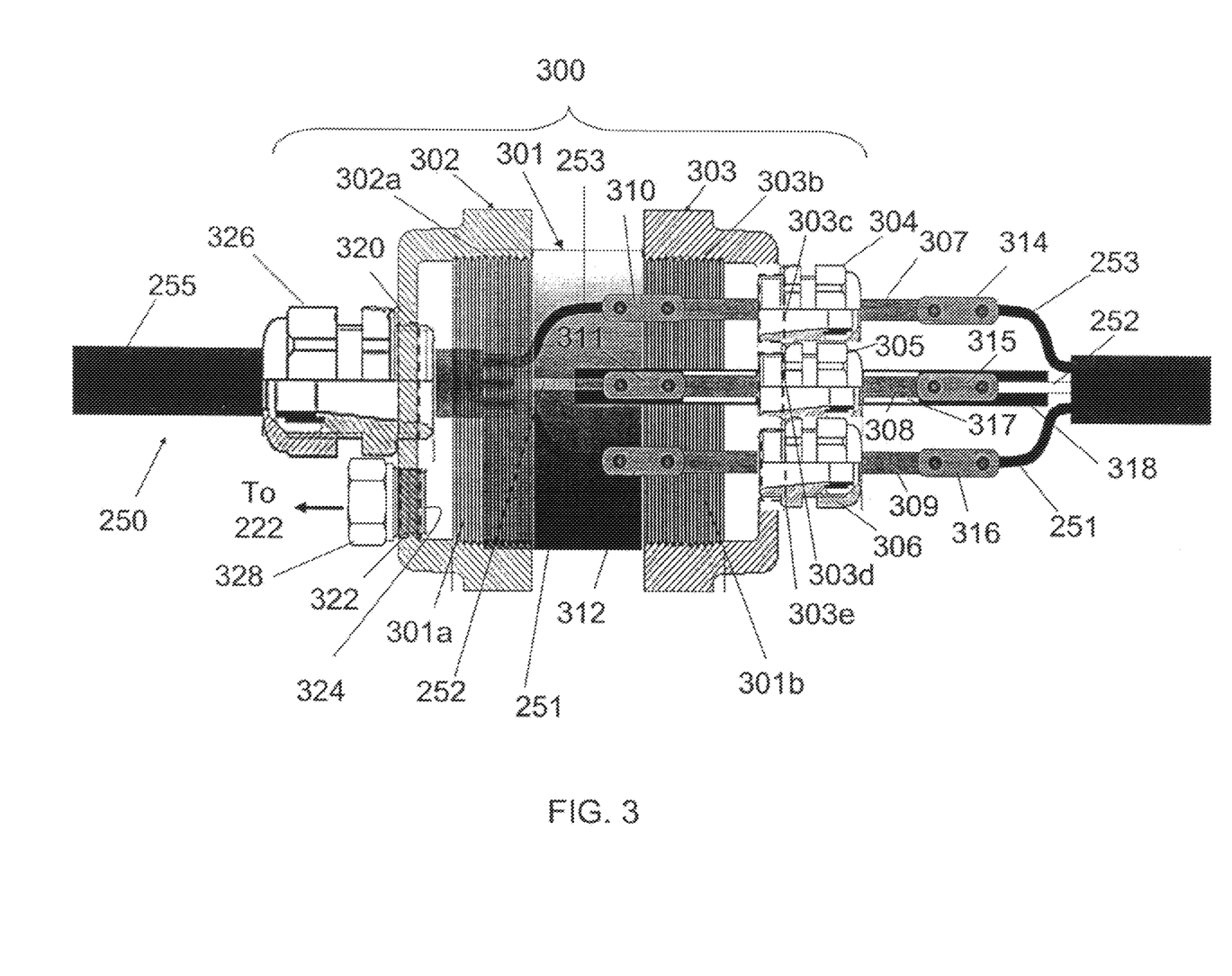
FIG. 3 shows further details of a power cable end seal.
Figure 6:
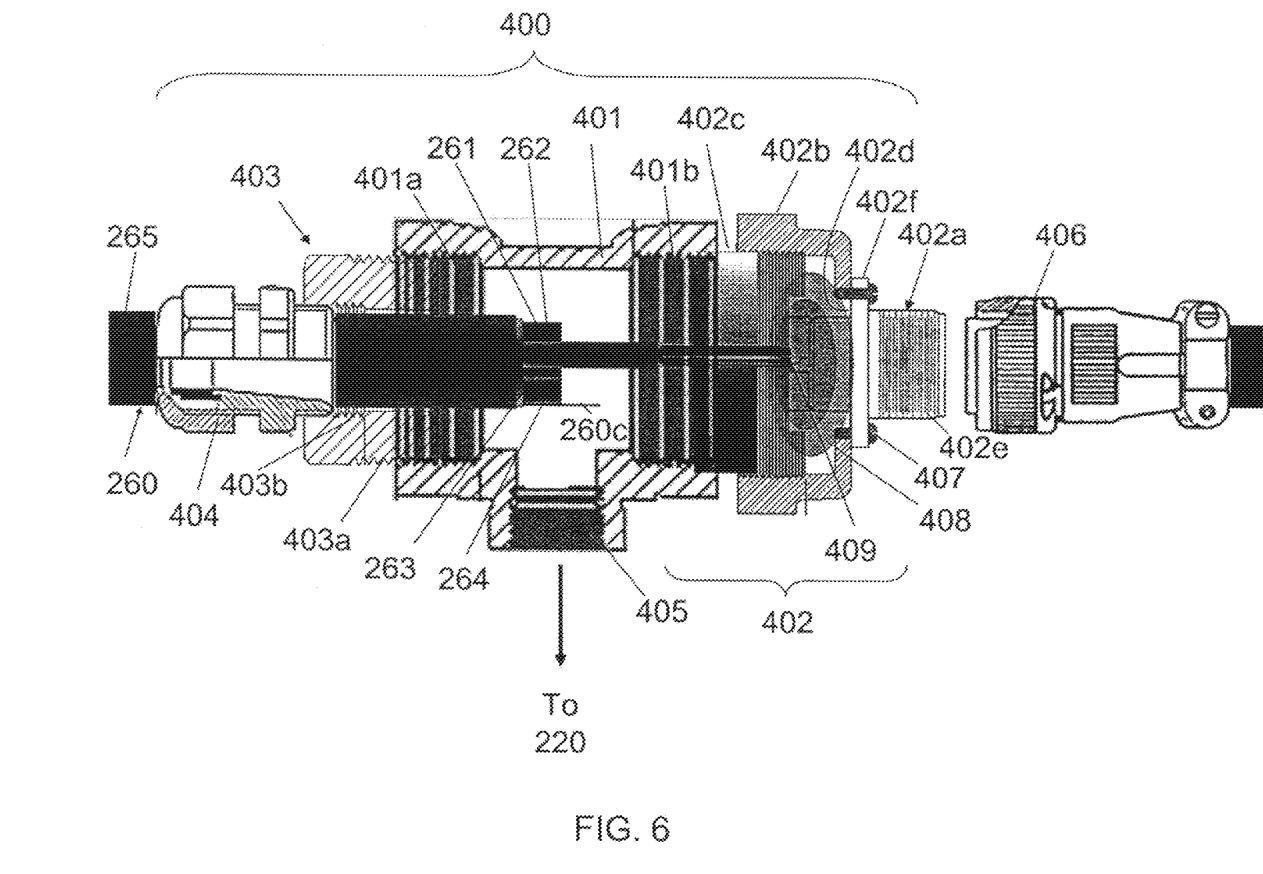
FIG. 6 shows further details of a data cable end seal.

Power cable end seal 300, shown in FIGS. 2 and 3, provides a convenient approach for sealing a second end of the power cable yet provide access to the internal passageways within power cable 260 so that power cable 260 can be suitably pressurized. End seal 300 also permits the electrical connections to continue through the end seal and allows power wires 251, 252, and 253 to be accessed by the generator control box or other load or grid interconnection means (not shown). Likewise, data cable end seal 400, schematically shown in FIG. 2 and in detail in FIG. 6, shows another approach for sealing the second end of a cable while providing access to pressurize the interior of the cable and to continue the electrical connection. End seal 400 allows the data cable comprising data cables 261, 262, 263, and 264 to be accessed by the data acquisition and control system (DACS)(not shown). If desired, the cable end seals 300 and 400 can be placed within protective enclosures, such as for example, tubes 224 and 226 shown in dotted line in FIG. 1. It should be noted that although the pressure system is described with certain maximum pressure values, the maximum pressure values can be increased or otherwise varied depending upon the cable being used, where the turbine is located, its depth, the strength of the nacelle and other such factors. It should also be understood that while two different end seal configurations are shown and described herein, each end seal, while different in construction, is fundamentally the same in providing a pressurizing access to the interior of the cable and providing a way to continue the electrical connection there beyond. Thus, as cable types might change, the end seal might have to physically change as well to accommodate a particular cable structure while still providing the access to the interior of the cable and a continuation of the electrical pathway beyond a gas seal, and each is included herein.

FIG. 2 shows an exemplary power cable 250 and an exemplary data cable 260 with respective end seals 300 and 400/500. An exemplary power cable 250 is comprised of three insulated #4AWG power wires 251, 252, and 253 that are encased in outer jacket 255. Wires 251, 252, and 253 within outer jacket 255 come from turbine 100 and are fed into the cable end seal 300 through a gland seal. Within the cable end seal 300, the overall jacket 255 and/or individual insulating jackets are opened so that they may be sealed or made available to a pressure port. The conductors 251, 252, and 253 pass through the cable end seal 300 in such a way that no gas can be transmitted through the end seal 300. It should be noted that although the above exemplary embodiment is comprised of three suitable insulated power wires for carrying the electrical signals there along, other wiring methods with a different numbers of wires may be employed depending on the specific requirements or needs of a particular installation. It should also be noted that wires of various gauges can be used, with the requirements being that the wires must be capable of the handling the voltage and current levels associated with the power being generated and fed to a grid or other load, and sealing configurations may vary depending upon the specific gauges used.

An example of a power cable that can be used is a 3 Cond. #4AWG Coleman SEEO. When a single power cable 250 is used to transmit both power signals and data signals a power line communication protocol such as X10 or Echelon, or an equivalent, can be employed.

Exemplary data cable 260 comprises, for example, a plurality of sets of shielded twisted pair wires 261, 262, 263, and 264. The sets of twisted pair cables 261-264 are enclosed within a shield and overall jacket 255 that forms the exterior of data cable 260 which runs underwater from nacelle 104 until it is fed through a data cable end seal for which two embodiments 400 or 500 are shown. Within the cable end seal 400/500, the overall jacket 255 and/or individual insulating jackets are opened so that they may be sealed or made available to a pressure port. An example of such a data cable is an Okonite 261-60-4404. It should be noted that although four sets of twisted pair cables are disclosed as being used in the present example, any number of twisted pairs or other types or forms of wire or cable can be used, including but not limited to coaxial, twin axial, triaxial, hybrid, and optical fiber cable. The data can be communicated on data cables 260 using any type of modulation or encoding standard that provides sufficient data transfer rates over sufficient distances, as would be appreciated by one skilled in the art, such as the RS-485 standard.

When monitoring or controlling the pressure of the nacelle 104, it is important to create an entry point for positive pressure to be fed along an open pathway provided or formed within and along the length of cables 250 and 260. This is accomplished by using an end seal device that provides a mechanism for both continuing the electrical connections to a power cable beyond the point where positive pressure starts once the pressurized cable exits the water; and creating the starting point for that positive pressure.

FIG. 3 shows a more detailed view of power cable end seal 300. It is comprised of three main portions: a body 301, a primary end cap 302, and a secondary end cap 303. Body 301 is preferably formed as a hollow cylindrical body that can be formed from metal, such as iron or aluminum, or from synthetic materials, such as, PVC, plastics, resins or other extruded material. Body 301 preferably has threaded opposing ends 301a and 301b that permit body 301 to be sealed on both ends. Primary and Secondary end caps, 302 and 303, can be formed from the same material as body 301, as noted above, and preferably have one opened end with threads 302*a* and 303*b*, respectively corresponding to the respective threaded ends 301*a* and 301*b*. When in place, end caps 302 and 303 provide air tight seals at the ends of body 301. Thread sealant or other suitable materials can also be used as long as air tight seals can be formed. Furthermore, other methods of creating an air tight cavity within body 301 can be used along with a variety of shapes, including having the end caps 302 and 303 glued in place or otherwise held or bonded to the body 301.

Primary end cap 302 has one end threaded onto body 301 and two threaded openings 320 and 322 are provided in the opposite end. A gland seal 326 is mounted in opening 320 and a pipe pressure port 324 is mounted in opening 322. Gland seal 326 and pipe pressure port 324 are typically screwed into respective openings 320 and 322 with a tapered pipe thread and sealed with tape or compound. As an alternative, these connections could use a straight screw and o-ring seal with no compound. Gland seal 326 provides an airtight seal about cable 250 without any significant collapsing of the outer cover or sheath 255 by using an outer nut (not shown) that when tightened compresses a flexible rubber gland (not shown) about the exterior of outer cover 255. It is not necessary to use compound for this seal, but compound can be used if desired. By compressing the gland, the jacket 255 of power cable 250 is able to pass through end cap 303 without letting air pass between the jacket of power cable 250 and gland seal 326 interface.

Secondary end cap 303 includes three openings 303*c*, 303*d*, and 303*e* at the opposite end from the threaded opening including threads 303*b*. The three openings 303*c*, 303*d*, and 303*e* are formed in such a way that three separate gland seals 304, 305, and 306 can be threaded into end cap 303 so that airtight seals can be formed about copper rods 307, 308, and 309, or other similar conductors, using any appropriate sealing method as described in accordance with gland seal 326.

Figure 4:
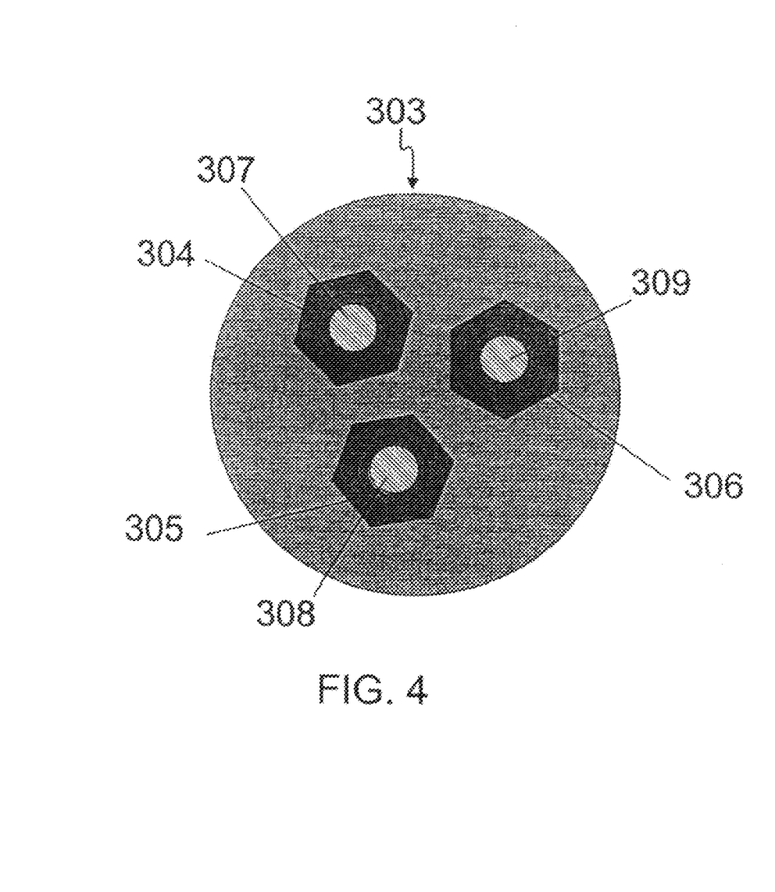
FIG. 4 shows an end view of a power cable seal end cap.

FIG. 4 shows an end view of end cap 303. It should be noted that although end cap 303 is shown with three air tight electrical passages, any number of air tight passages could be used.

Returning to FIG. 3, the end seal 300 provides a way to interconnect the ends of two cables, for example, one coining from the turbine and the other leading to the control room, so that the wires can be electrically connected together while at the same time providing a sealed and pressurized access to the interior of the cable going to the turbine. The ends of the respective power wires 251, 252, and 253 of power cable 250 can be exposed and connected using the end seal 300 thereby creating a pressurized environment there around as well as a way to continue the electrical connection between two cables. It should be understood that one cable exiting the end seal 300 will extend to the turbine and that cable will be pressurized. The other cable could be an extension of that first cable, a completely different cable, a cable of a different type or a totally unrelated cable, as long as the other or second cable can handle the necessary voltage and current levels coming from the first cable or within the cable system. Power along wires 251, 252, and 253 will be transmitted through the gland seals 304, 305, and 306 of end cap 303 using copper rods 307, 308, and 309. The outer ends of copper rods 307, 308, and 309 use inline couplers 314, 315, and 316 to create an electrical connection to the ends of one set of the wires 251, 252, and 253 outside of the pressurized environment of end seal 300.

The interior ends of copper rods 307, 308, and 309, within the pressurized environment of seal 300, are then connected to the other end of wires 251, 252 and 253 of the other side of cable 250, using inline couplers 310, 311, and 312 respectively. Copper rods 307, 308, and 309, on both sides of the gland seals 304-306, are each, individually, covered by an insulating sleeve and sealed, for example, with heat shrink material, as shown respectively at 317 and 318 for rod 308. The insulated rods 307, 308, and 309 are fed through gland seals 304, 305, and 306 in manner similar to the manner in which cable 250 is fed through gland seal 326. This allows the power (and perhaps signals) transmitted along copper rods 307, 308, and 309 to be fed through the gland seals 304, 305, and 306 to wires 251, 252, and 253 while maintaining an airtight seal and adequately insulated connections.

The use of this architecture for end seal 300, described above allows the electrical current flowing along wires 251, 252, and 253 to pass through end seal 300 without letting air pass through either end cap 302 or 303, thereby maintaining the pressurized environment within end seal 300.

Since both ends of the cable end seal 300 are airtight and the nacelle 104 of the turbine 100 is connected to the cable end seal 300 via the airtight outer jacket 255 of power cable 250, cable 250 will be effectively sealed and no air will flow there along when valve 222 and port 324 remained closed. In this configuration, no air will vent from the interior of nacelle 104 via cable 250. In another configuration, the nacelle 104 and outer jacket of power cable 250 can be pressurized by pressurizing the interior of power cable end seal 300. As shown in FIG. 3 one embodiment is to pressurize end seal 300 by forcing a pressurized gaseous mixture into the cable end seal 300 through the pipe pressure port 324.

Pipe pressure port 324 is connected to shut down valve 222 via a fitting 328, as shown in FIG. 1, which allows the pipe pressure port 324 to be either open or closed. When the shut down valve 222 is open, positive pressure from pressure source 210 can enter end seal 300 and pass into cable 250 so that the positive pressure created in the end seal 300, will flow along power cable 250, and into nacelle 104. When shut down valve 222 is closed, no gas can escape the power cable end seal 300 and previously established pressure can be maintained. When shut down valve 222 is closed, water ingress into nacelle 104 will be reduced by having stopped air from venting through cable 250.

One way to provide the open passageway along the cables is to use the space between power wires 251, 252, and 253 as they are enclosed within the jacket 255 of power cable 250. The amount of space that is between power wires 251, 252, and 253 depends on how the wires are wound and by the type of fillers used between the conductors and by how tightly the outer jacket 255 of power cable 250 is wrapped or otherwise formed around power wires 251, 252, and 253. The outer jacket 255 of power cable 250 is an airtight insulator that runs under water and eventually terminates in the airtight nacelle 104 of the turbine 100 as described in accordance with FIG. 1.

An alternative to using the space between the wires 251, 252, and 253 to provide gas to the nacelle 104 is to place a separate gas conducting tube or conduit within the outer jacket of power cable 250. FIG. 5 shows a cross section of power cable 250 with a separate fluid (gas or air, for example) conducting tube 254 enclosed within the outer jacket 255 of power cable 250. Such a conducting tube could be appropriate when the space between the wires 251, 252, and 253 do not provide adequate gas transmission to the nacelle 104, or where it may be desirable to ensure a specific fluid transmission cross sectional area. Furthermore, multiple gas conducting tubes could be placed within the outer jacket 255 and any number of gas conducting tubes could be used to conduct gas in addition to using the outer jacket 255.

FIG. 6 shows another example of how to pressurize a cable used, for example the data cable 260 and end seal 400. Like end seal 300, end seal 400 also comprises three main portions: a body 401, a primary end piece 402, and a secondary end piece 403, where the ends pieces 402 and 403 are threaded and connected to the body 401 so that air tight seals are formed.

Body 401 is typically a pipe tee that has threaded ends 401a and 401b and threaded portion 405 that is formed at the mid-point of the outer wall. Threaded portion 405 is used to provide a positive pressure to body 401. In should be noted, that cable end seals can have a pressure port located at a variety of locations, for example on either end or along the body of the end seal structure.

End piece 403, which is typically a bushing, performs a function similar to the end caps used in end seal 300. That is, end piece 403 has threads 403a that when connected to the threads 401a of body 401 form an airtight seal. End piece 403 uses threading to receive a single gland seal 404 in a threaded opening 403b, in a similar manner to the way gland seal 326 is connected to end cap 302. Gland seal 404 forms an air-tight seal about the exterior 265 of cable 260 as well as an airtight seal between the threaded connections of gland seal 404 and end piece 403.

The outer jacket 265 of cable 260 is opened within the interior of end seal 400. The four sets of shielded twisted pair wires, 261, 262, 263, and 264 each of which are shielded (not shown) and have a drain wire (not shown) are exposed. Further, a shield with a drain 260c which encloses the twisted pair wires, 261, 262, 263, and 264 is also exposed.

End seal 400 differs from end seal 300 in that end piece 402 of the end seal 400 does not use gland seals. Instead, end piece 402 employs a unique design which allows a data connector to be connected directly to the end seal 400 without allowing air to escape from body 401. End piece 402 comprises a connector end 402a that is secured to a pipe cap 402b, and an interconnecting threaded pipe connector 402c i.e. a pipe nipple. It should be understood, however, that end piece 402 could be formed with a threaded female end that would connect with body 401 rather than using a separate connector, such as pile nipple 402c, as well as other forms of fittings or sealing/connection application.

The connector end 402a, which is a bulkhead connector in this exemplary embodiment, includes an interior section that fits within an opening 402d on one end of end cap 402b and a threaded exterior 402e to accept a mating cable connector, a mounting and sealing and mounting plate 402f that is held to end cap 402b by mounting screws 407. The body of connector end 402a, together with threaded exterior 402e, includes pins corresponding to the sockets of a cable connector 406. In the exemplary embodiment, which has four twisted pairs, the connector end 402a has 14 pins: two for the two wires of each twisted pair, four for the drains of each twisted pair, one for the drain of the overall shield and one spare. The connector end 402a is attached to pipe cap 402b by mounting plate 402f, using a suitable gasket and/or sealing compound (not shown) by screws 407. The interface between mounting plate 402f and pipe cap 402b is sealed, and connector end 402 is itself potted which effects a positive seal around all the sockets and pins and collectively seal connector end 402a so that no air can escape through that connection. Thus, connection end 402a is itself sealed internally around the connecting pins so that when plate 402f is sealed to cap 402b that portion of end seal 400 is airtight.

Threaded pipe connector 402c has two threaded ends and connects pipe cap 402b to body 401 in similar way to the way that body 301 of power cable seal 300 is connected to primary and secondary end caps 302 and 303.

The wires and drains of twisted pairs 251, 252, and 253 of the data cable are soldered to the connector pin ends of bulkhead connector end 402a as shown for connection 409. To insulate the exposed wires and prevent gas leaks, the volume surrounding the solder joints, and the back of the connector end 402a, is encapsulated with epoxy 408 or the like.

Pressure port 405 is similar to pressure port 324, in that it can be connected by suitable conduits to shut off valve 220, as shown in FIG. 1, which is connected to pressure source 202 so a positive pressure can be created within the interior of end seal 400 with pressurized gas and then pass into cable 260 through the exposed end within end seal 400. Thus, cable 260 can be used as the pressure conduit to nacelle 104 so that the interior of nacelle 104 can be pressurized. When shut down valve 220 is closed water ingress is reduced or avoided by having stopped air from venting through cable 260.

Figure 7:
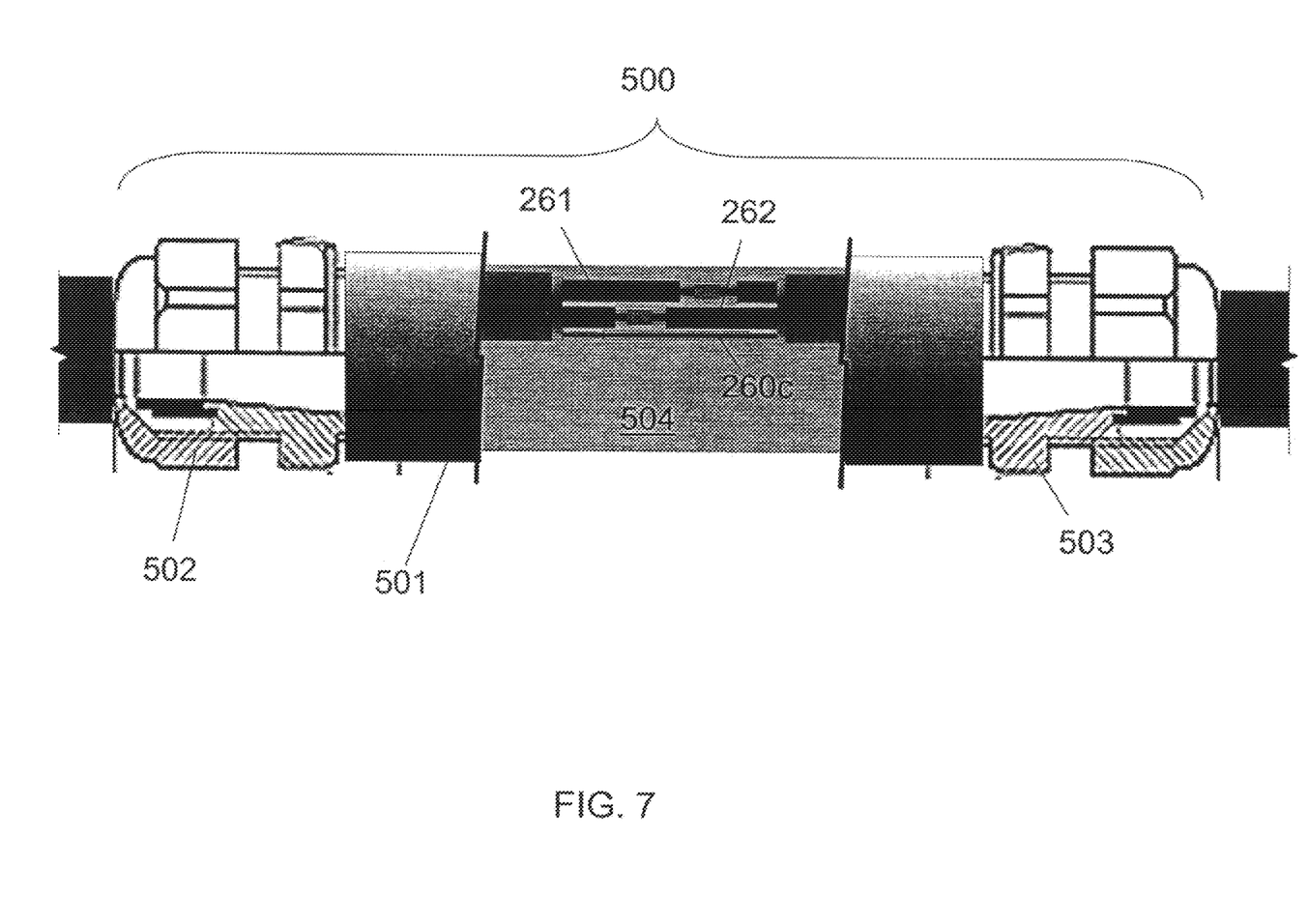
FIG. 7 shows an alternative inline seal.

FIG. 7 shows an alternative inline seal 500 that can interconnect two cables, either data or power cables, but without a pressure port. Such an inline seal can be used when an operator wants to use some other means to pressurize the nacelle yet use cables for either or both power and/or data and where a cable connection device is needed for joining cable ends. For example, where only the power cable 250 is used to pressurize the nacelle 104 then this inline seal could be used to simply seal the cable 260, being used to send data, power, or a combination of data and power, to prevent water ingress by stopping air from venting there through without the capability of monitoring and controlling the pressure passing there through. Inline seal 500, for example, can comprise a body 501 in the form of a coupling member with female threads on each end thereof, and end pieces 502 and 503. End pieces 502 and 503 are simply gland seals that attached to body 501 in a similar manner as gland seal 404 attaches to body 401. Within the body 501 each conductor within the chosen type of wiring, for example, the twisted pairs or another form of wiring 261, 262, 263, and 264, can be stripped and tinned to prevent air from leaking between the metal strands of the wires and the interior of the body 501 can be filled with epoxy 504 to provide additional insulation and to complete the gas sealing.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A pressurized cable system comprising:
    a cable having first and second ends, an open pathway for conducting positive pressure there along, and at least one pair of insulated wires therein; and
    a source of continuous positive pressure;
    wherein the first end is sealed to open into an airtight enclosure, and the second end is operatively connected to the source of continuous positive pressure so that positive pressure can be applied along the open pathway and into the airtight enclosure.

2. The pressurized cable system of claim 1, wherein one end of the at least one insulated wires terminates at an electrical connection within the airtight enclosure.

3. The pressurized cable system of claim 2, wherein the airtight enclosure is the nacelle of an underwater power generating device.

4. The pressurized cable system of claim 3, wherein another end of the at least one insulated wires terminates at an electrical connection outside of the positive pressure.

5. The pressurized cable system of claim 2, wherein another end of the at least one insulated wires terminates at an electrical connection outside of the positive pressure.

6. The pressurized cable system of claim 1, wherein the open pathway is formed within the cable to extend along the said at least one pair of insulated wires.

7. The pressurized cable system of claim 1, wherein the second end is connected to the source of continuous positive pressure within an airtight enclosure comprised of a main body, at least one airtight connection for admitting at least one cable connection there through and a pressure connection port.

8. The pressurized cable system of claim 7, wherein pressure connection port further includes a pressure regulator.

9. The pressurized cable system of claim 7, wherein the main body comprises a central structure and further including end caps for enclosing each end of the central structure, said at least one air tight connection being located within one of said end caps.

10. The pressurized cable system as in claim 1 wherein the second end is connected to an end seal comprised of:
 a pressurized hollow body,
 first and second end caps attached to opposite ends of the hollow body,
 the first end cap including a pressure port and a cable connection extending through a gland seal therefore,
 the second end cap including a plurality of gland seals, alike plurality of conductive members each having an inside end and an outside end with each conductive member extending from outside the hollow body through a respective one of the plurality of gland seals into the interior of the hollow body, and inline coupling devices for each of the plurality of conductive members for connecting each inside and outside end thereof to respective wiring inside and outside the hollow body.

11. The pressurized cable system as in claim 10 wherein each conductive member is a solid copper rod.

12. The pressurized cable system as in claim 1 wherein the second end is connected to an end seal comprised of:
 a pressurized hollow body having a pressure port,
 first and second ends at opposite ends of the hollow body,
 the first end including an end cap connected to the hollow body and having a cable connection extending through a gland seal therefore,
 the second end including an end cap connected to the hollow body and having a pin connector sealingly secured therein, the pin connector having an exterior connection for mating with a cable connector and an interior connection for mating with wire ends from the at least one pair of insulated wires.

13. A method for controlling the environment in a closed nacelle of an underwater power generating device comprising:
 providing cabling to the underwater power generating device that includes at least one open fluid passageway extending there along;
 sealing the cabling to the shell of the closed nacelle to provide a sealed and controlled fluid pathway into the nacelle; and
 sealing a second end of the cabling to provide access the interior of the cabling and to control the passage of fluid there along; and
 providing positive pressure from a source of such positive pressure along the cabling into the enclosed nacelle.

14. The method of claim 13, including the additional step of connecting the second end to a source of positive pressure and pressurizing the closed nacelle using the fluid pathway.

15. The method of claim 14, including the additional step of maintaining a positive pressure within the closed nacelle.

16. The method of claim 14, including the additional step of maintaining a positive pressure of at least 1 psi within the closed nacelle.

17. The method of claim 14, including the additional step of varying the pressure within the closed nacelle to a range between about zero to about fifty percent greater than water pressure acting on the exterior of the nacelle.

18. The method of claim 14, including the further step of providing an increased pressure within the closed nacelle of at least 0.5 psi above the water pressure acting on the exterior of the nacelle.

19. The method for controlling the environment in a closed nacelle of an underwater power generating device as in claim 13 wherein the cabling comprises power and data wiring for electrically connecting the underwater power generating device to a control station.

20. An underwater power generating system comprising:
 an underwater power generating device comprising a closed nacelle;
 a pressure generating system;
 a cable connecting the closed nacelle of the underwater power generating device to the pressure generating system wherein said cable is adapted to:
  provide a pathway along which positive pressure generating system is fed into an interior area of the closed nacelle; and
  transmit power generated by the power generating device.

21. The underwater power generating system of claim 18, further comprising:
 a data acquisition system;
 at least one sensor within said closed nacelle;
 and wherein said cable includes a data transport mechanism to transmit data from said at least one sensor to the data acquisition system.

22. A method for preventing the fluid ingress in a closed nacelle of an underwater power generating device comprising:
 providing a cable to extend from a control station to the closed nacelle to transmit power and data between the underwater power generation device and the control station, the cable being formed to include at least one open fluid passageway extending there along;
 sealing the cable to the shell of the closed nacelle to provide a controlled fluid pathway into the nacelle;
 sealing a second end of the cable in such a way that electrical signals can be received outside of the controlled fluid pathway without allowing fluid to escape the controlled fluid pathway; and
 providing a connection between a source of positive pressure through the second end and along the controlled fluid pathway to place the interior of the closed nacelle under positive pressure.

23. A sealed cable system for an underwater turbine having an air tight nacelle comprising:
 a cable having first and second ends and at least one pair of insulated wires therein; said cable passing between a control station and a nacelle of the turbine, wherein at least one of the first and second ends is sealed so that air cannot vent from within the nacelle via the cable.

24. The sealed cable system as in claim 23 wherein the first end is sealed within the nacelle.

25. The sealed cable system as in claim 23 wherein the second end is sealed within an end seal.

* * * * *